April 19, 1955     H. L. BLYDENBURGH     2,706,372

LEAF GRINDER HAVING DISK TYPE BLADE

Filed Feb. 21, 1950

Inventor
Harold L. Blydenburgh
By Barthel & Bugbee
Attorneys 2,706,372
Patented Apr. 19, 1955

2,706,372

LEAF GRINDER HAVING DISK TYPE BLADE

Harold L. Blydenburgh, Detroit, Mich., assignor to The Moto-Mower Company, Detroit, Mich., a corporation of Michigan Application February 21, 1950, Serial No. 145,462

7 Claims. (Cl. 56—25.4)

This invention relates to lawn treating machines and, in particular, to leaf grinders.

One object of this invention is to provide a leaf grinder which will quickly and easily grind up the leaves on the lawn into tiny pieces as the machine is moved over the lawn.

Another object is to provide a leaf grinder attachment which may be quickly connected to and disconnected from a lawnmower at the desire of the operator in the autumn after the lawn mowing season is over and the leaves have fallen on the lawn.

Another object is to provide a leaf grinder wherein the leaves are pulled up into a cylindrical chamber by suction and churned around while colliding with the roughened walls of the chamber so as to be broken up into tiny pieces which pass out through perforations in the chamber wall.

Figure 1:
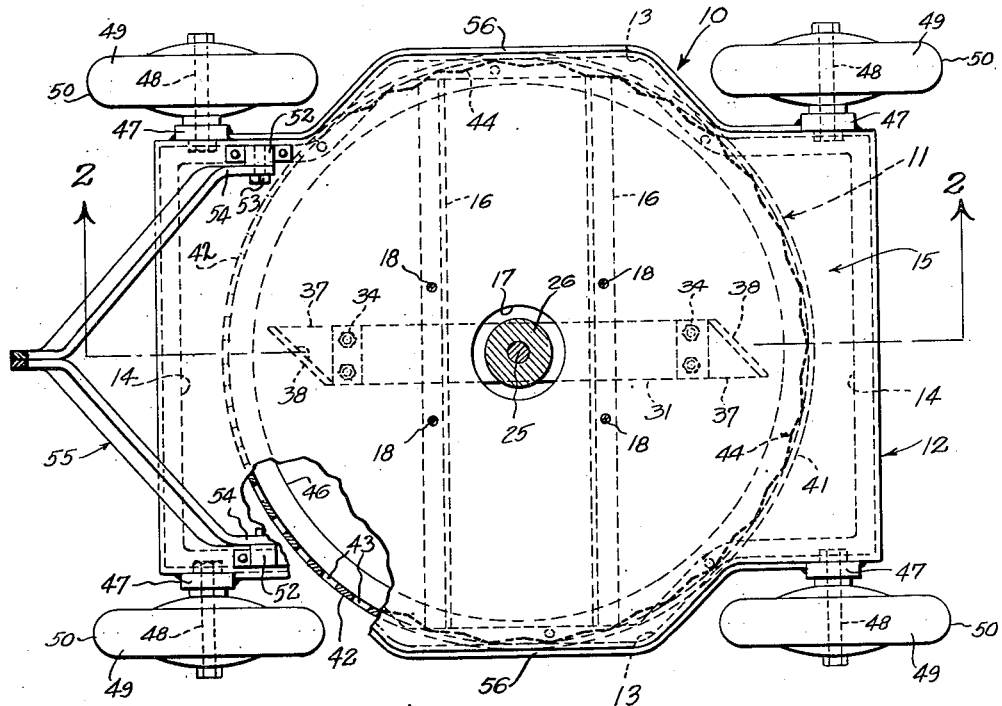
Figure 1 is a top plan view, partly in section, with the engine removed, of a leaf grinder according to one form of the invention.
Figure 3:
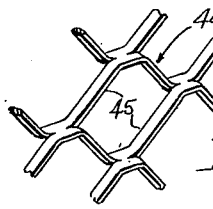
Figure 3 is an enlarged perspective view of a portion of the lining of the leaf grinder chamber wall.
Figure 2:
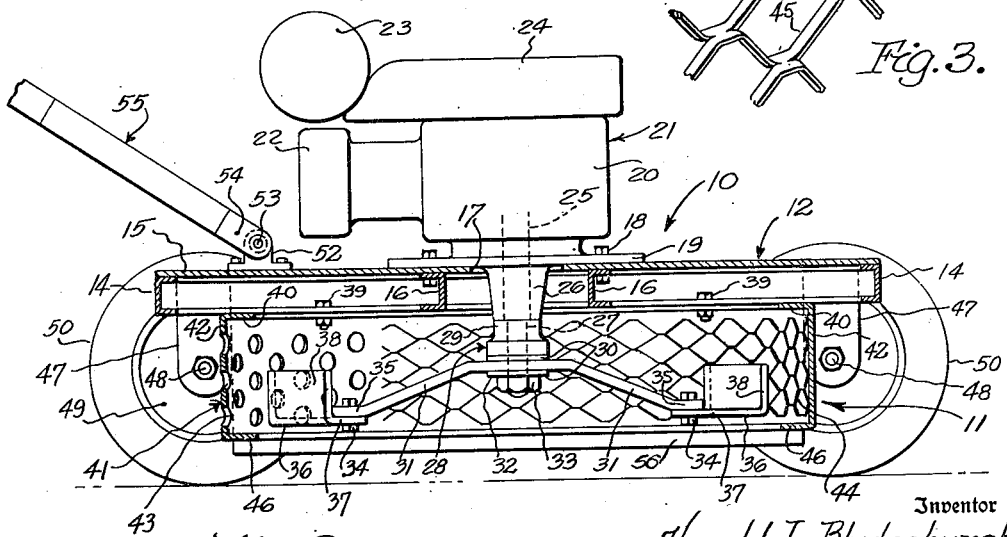
Figure 2 is a central vertical section through the leaf grinder of Figure 1, taken along the line 2—2 in Figure 1.

Referring to the drawings in detail, Figure 1 shows a conventional power lawnmower, generally designated 10, which has been temporarily converted into a leaf grinder by a leaf grinder attachment, generally designated 11. The lawnmower includes a chassis 12 consisting of side and end channel members 13 and 14 respectively joined together at the corners of the chassis 12, as by welding. Secured as by welding to the channel members 13 and 14 is a top plate 15 of sheet metal or other suitable material. Extending transversely across the chassis 12 and forming a part thereof are two oppositely-facing parallel channel mmebers 16 arranged on opposite sides of an aperture 17. Secured as at 18 to the top plate 15 and channel member 16 is the base plate 19 of the crankcase 20 of a conventional internal combustion engine, generally designated 21 having the usual cylinder 22 and gasoline tank 23 supported by the shroud 24 surrounding the flywheel (not shown). The latter is mounted on the upper end of the crankshaft 25 which extends downward through a centrally bored boss 26 depending from the base plate 19 and terminates in a reduced diameter portion 27.

Mounted on the reduced diameter portion 27 of the engine crankshaft 25 is a slipping drive connection 28 of any suitable type. This includes an upper hub 29 bored for the passage of the shaft portion 27, friction washers 30 on opposite sides of a rotary support or cutter bar 31, a retaining washer 32 preferably of the spring type, and a nut 33 threaded upon the lower end of the shaft portion 27. This arrangement is such that if the rotary bar 31 encounters an obstruction such as a stone or a root, the engine 21 will keep on running while the cutter bar 31 is halted by the obstruction, this being permitted by the slipping drive connection 28.

The rotary cutter bar 31 is inclined downward and outward from the drive connection 28, and bolted as at 34 to its outer end portions 35 are leaf beating blades or members 36. The latter replace triangular cutter blades (not shown) bolted in the same manner when the machine 10 is used as a lawnmower. The members 36 consist of base portions 37 having upstanding portions 38 inclined at an oblique angle to the axis of the bar 31, for example at about 45 degrees.

Secured as by the fasteners 39 to the lower flanges of the side channel members 13 is the upper flange portion 40 of a cylindrical leaf grinder casing 41, the rearward portion of the side wall 42 of which is provided with multiple spaced apertures or perforations 43. Secured as by welding to the inside of the remainder or unperforated side and front portions of the casing side wall 42 is a screen-like mesh member 44 of so-called expanded metal having its meshes 45 formed by being struck out of sheet metal in a well-known manner. Such expanded metal, for example, is used for metallic lath in building wall construction. The expanded metal member 44 forms an arcuate grinding member against the sharp edges of which the leaves are churned and ground up, as explained in connection with the operation of the invention. The lower edge of the leaf grinder casing 41 terminates in an inwardly extending flange 46 which serves to prevent an outward air blast which would blow leaves away from the machine as it is pushed over the lawn.

Extending downward from the forward and rearward ends of the side channel members 13 are ears 47 welded thereto and carrying axle bolts 48 on which ground wheels 49 are rotatably mounted, these preferably being equipped with pneumatic tires 50. Secured as at 51 to the top plate 15 and side members 13 of the chassis 12 near the rearward end of the machine are pillow blocks or journal bearings 52 carrying pivot pins or bolts 53 which pivotally support the lower ends 54 of a yoke-shaped handle 55 by which the machine is propelled. The upper portion of the handle 55 (not shown) carries the usual cross bar to enable it to be grasped by the operator. Secured as by welding to the opposite side members 13 are downwardly extending sheet metal skirts or shields 56 which in the use of the machine as a lawnmower protect the operator against injury from the rapidly rotating cutter blades on the cutter bar 31.

Prior to the operation of the invention, let it be assumed that the lawnmower cutting blades have been detached from the ends 35 of the rotary cutter bar 31 and replaced by the leaf beating blades or members 36, also that the casing 41 has been secured by the fasteners 39 to the chassis 12. To operate the leaf grinder, the operator starts the engine 21, thereby causing the cutter bar 31 to rotate rapidly in a substantially horizontal plane, causing its angled leaf beating mmebers 36 to sweep through circular paths. This creates a fan-like suction, sucking the leaves upward into the casing 41. Here the leaves are churned around by the members 36 and forced into the space between the ends of the members 36 and the casing 41, the inner wall of which is equipped with the roughened member 44. As the leaves are rubbed against these roughened portions or meshes 45, the sharp edged multiple ridges formed by the expanded metal break up the leaves into small pieces. These leaf pieces are swept around and around by the members 36 until they are small enough to pass out through the perforations 43. The tiny particles of leaves thus created settle down between the blades of the grass on the lawn and furnish protection for the roots of the grass as well as fertilizer. Thus, as the operator pushes the machine to and fro across the lawn, the leaves lying upon the grass are rapidly converted into a finely divided mulch which is beneficial to the lawn.

What I claim is:

1. A leaf grinder for use with a power lawnmower having a rotary vertical shaft projecting downward from the chassis thereof, said grinder comprising a rotary support attachable to said shaft and rotatable in a substantially circular path of rotation, leaf beating members connected to the outer portions of said support and disposed on said support in positions producing upwardly-directed suction in response to the rotation of said support, and an open-bottomed casing having a side wall of substantially circular cross-section attachable to and depending from said chassis substantially concentric with said shaft, said casing having perforations in its side wall, said leaf beating members having upstanding blade portions extending into close proximity to said casing side wall.

2. A leaf grinder for use with a power lawnmower having a rotary vertical shaft projecting downward from the chassis thereof, said grinder comprising a rotary support attachable to said shaft and rotatable in a substantially circular path of rotation, leaf beating members connected to the outer portions of said support and disposed on said support in positions producing upwardly-directed suction in response to the rotation of said support, and an open-bottomed casing having a side wall of substantially circular cross-section attachable to and depending from said chassis substantially concentric with said shaft, said casing having perforations in its side wall, said leaf beating members having upstanding blade portions extending into close proximity to said casing side wall, said casing having a roughened inner wall cooperating with said leaf beating members to disintegrate the leaves therebetween.

3. A leaf grinder for use with a power lawnmower having a rotary vertical shaft projecting downward from the chassis thereof, said grinder comprising a rotary support attachable to said shaft and rotatable in a substantially circular path of rotation, leaf beating members connected to the outer portions of said support and disposed on said support in positions producing upwardly-directed suction in response to the rotation of said support, and an open-bottomed casing having a side wall of substantially circular cross-section attachable to and depending from said chassis substantially concentric with said shaft, said casing having perforations in its side wall, said leaf beating members having upstanding blade portions extending into close proximity to said casing side wall, said casing having multiple leaf-grinding projections extending inwardly from its inner wall cooperating with said leaf beating members to disintegrate the leaves therebetween.

4. A leaf grinder for use with a power lawnmower having a rotary vertical shaft projecting downward from the chassis thereof, said grinder comprising a rotary support attachable to said shaft and rotatable in a substantially circular path of rotation, leaf beating members connected to the outer portions of said support and disposed on said support in positions producing upwardly-directed suction in response to the rotation of said support, an open-bottomed casing having a side wall of substantially circular cross-section attachable to and depending from said chassis substantially concentric with said shaft, said casing having perforations in its side wall, said leaf beating members having upstanding blade portions extending into close proximity to said casing side wall, and a stationary leaf grinding member secured to and extending around the inner wall cooperating with said leaf beating members to disintegrate the leaves therebetween of said casing and having inwardly projecting leaf-grinding ridges thereon.

5. A leaf grinder for use with a power lawnmower having a rotary vertical shaft projecting downward from the chassis thereof, said grinder comprising a rotary support attachable to said shaft and rotatable in a substantially circular path of rotation, leaf beating members connected to the outer portions of said support and disposed on said support in positions producing upwardly-directed suction in response to the rotation of said support, an open-bottomed casing having a side wall of substantially circular cross section attachable to and depending from said chassis substantially concentric with said shaft, said casing having perforations in its side wall, said leaf beating members having upstanding blade portions extending into close proximity to said casing side wall, and a stationary leaf grinding member of arcuate perforated form secured to and extending around the inner wall cooperating with said leaf beating members to disintegrate the leaves therebetween of said casing and having inwardly projecting leaf-grinding ridges thereon.

6. A leaf grinder for use with a power lawnmower having a rotary vertical shaft projecting downward from the chassis thereof, said grinder comprising a rotary support attachable to said shaft and rotatable in a substantially circular path of rotation, leaf beating members connected to the outer portions of said support and disposed on said support in positions producing upwardly-directed suction in response to the rotation of said support, an open-bottomed casing having a side wall of substantially circular cross-section attachable to and depending from said chassis substantially concentric with said shaft, said casing having perforations in its side wall, said leaf beating members having upstanding blade portions extending into close proximity to said casing side wall, and a stationary leaf grinding member of arcuate open-mesh construction secured to and extending around the inner wall cooperating with said leaf beating members to disintegrate the leaves therebetween of said casing and having inwardly projecting leaf-grinding ridges thereon.

7. A leaf grinder for use with a power lawnmower having a rotary vertical shaft projecting downward from the chassis thereof, said grinder comprising a rotary support attachable to said shaft and rotatable in a substantially circular path of rotation, leaf beating members connected to the outer portions of said support and disposed on said support in positions producing upwardly-directed suction in response to the rotation of said support, and an open-bottomed casing having a side wall of substantially circular cross-section attachable to and depending from said chassis substantially concentric with said shaft, said casing having perforations in its side wall said leaf-beating members having upstanding blade portions extending into close proximity to said casing side wall, said blade portions being also disposed at acute angles to the radius of said support.

References Cited in the file of this patent

UNITED STATES PATENTS

| | | |
|---|---|---|
| Re. 18,944 | Beazley | Sept. 12, 1933 |
| 1,648,341 | Goble | Nov. 8, 1927 |
| 2,242,922 | Poynter | May 20, 1941 |
| 2,273,405 | Hoehn | Feb. 17, 1942 |
| 2,368,331 | Seaman | Jan. 30, 1945 |
| 2,500,981 | Eymeric | Mar. 21, 1950 |
| 2,521,972 | Haglund et al. | Sept. 12, 1950 |
| 2,538,643 | Gregory | Jan. 16, 1951 |